(12) United States Patent
Shimomura et al.

(10) Patent No.: US 12,464,733 B2
(45) Date of Patent: Nov. 4, 2025

(54) MAGNETIC MEMORY

(71) Applicant: KIOXIA CORPORATION, Tokyo (JP)

(72) Inventors: Naoharu Shimomura, Tokyo (JP);
Tsuyoshi Kondo, Kawasaki Kanagawa (JP); Yoshihiro Ueda, Yokohama Kanagawa (JP); Yasuaki Ootera, Yokohama Kanagawa (JP); Akihito Yamamoto, Naka Kanagawa (JP); Mutsumi Okajima, Yokkaichi Mie (JP); Masaki Kado, Kamakura Kanagawa (JP); Tsutomu Nakanishi, Yokohama Kanagawa (JP); Nobuyuki Umetsu, Kawasaki Kanagawa (JP); Michael Arnaud Quinsat, Yokohama Kanagawa (JP)

(73) Assignee: Kioxia Corporation, Tokyo (JP)

( * ) Notice: Subject to any disclaimer, the term of this patent is extended or adjusted under 35 U.S.C. 154(b) by 576 days.

(21) Appl. No.: 17/898,255

(22) Filed: Aug. 29, 2022

(65) Prior Publication Data

US 2023/0309321 A1    Sep. 28, 2023

(30) Foreign Application Priority Data

Mar. 1, 2022    (JP) ................................. 2022-031278

(51) Int. Cl.
*H10B 61/00* (2023.01)
*H10N 50/80* (2023.01)

(52) U.S. Cl.
CPC ............. *H10B 61/22* (2023.02); *H10N 50/80* (2023.02)

(58) Field of Classification Search
CPC ....................... G11C 11/1675; G11C 19/0808
See application file for complete search history.

(56) References Cited

U.S. PATENT DOCUMENTS

| 9,396,811 B2 | 7/2016 | Ootera et al. |
| 10,032,499 B2 | 7/2018 | Kado et al. |
| 2020/0303027 A1* | 9/2020 | Ueda .................. H10B 61/00 |

FOREIGN PATENT DOCUMENTS

| JP | 2015173145 A | 10/2015 |
| JP | 2017143175 A | 8/2017 |
| JP | 2020155178 A | 9/2020 |

* cited by examiner

*Primary Examiner* — Shih Tsun A Chou
(74) *Attorney, Agent, or Firm* — Kim & Stewart LLP

(57) ABSTRACT

A magnetic memory includes first magnetic members extending along a first direction. First and second wirings are spaced apart from the first magnetic members on a second end side of the first magnetic members. At least one of the first magnetic members is between the first and second wirings in a plan view from the first direction. A second magnetic member has a first portion facing the first wiring and electrically connected to a first magnetic member on one side and a second portion facing the first wiring on an opposite side. The second portion is electrically connected to another first magnetic member. A control circuit causes a current to flow through one of the first wiring or the second wiring when data is written into the first magnetic member that is between the first wiring and the second wiring.

33 Claims, 13 Drawing Sheets

MAGNETIC MEMORY

CROSS-REFERENCE TO RELATED APPLICATION(S)

This application is based upon and claims the benefit of priority from Japanese Patent Application No. 2022-031278, filed Mar. 1, 2022, the entire contents of which are incorporated herein by reference.

FIELD

Embodiments of the disclosure relate generally to a magnetic memory.

BACKGROUND

There has been a magnetic memory in which a magnetic wall of a magnetic member is moved (shifted) by causing a current to flow through the magnetic member. When data is written into the magnetic member, the current flows through a field line to generate a magnetic field around the field line. The data is written by changing a magnetization direction of the magnetic member with the generated magnetic field.

This, however, causes a problem in that the field line generally requires high power consumption to reliably write the data by use of the magnetic field.

DETAILED DESCRIPTION

Figure 1:
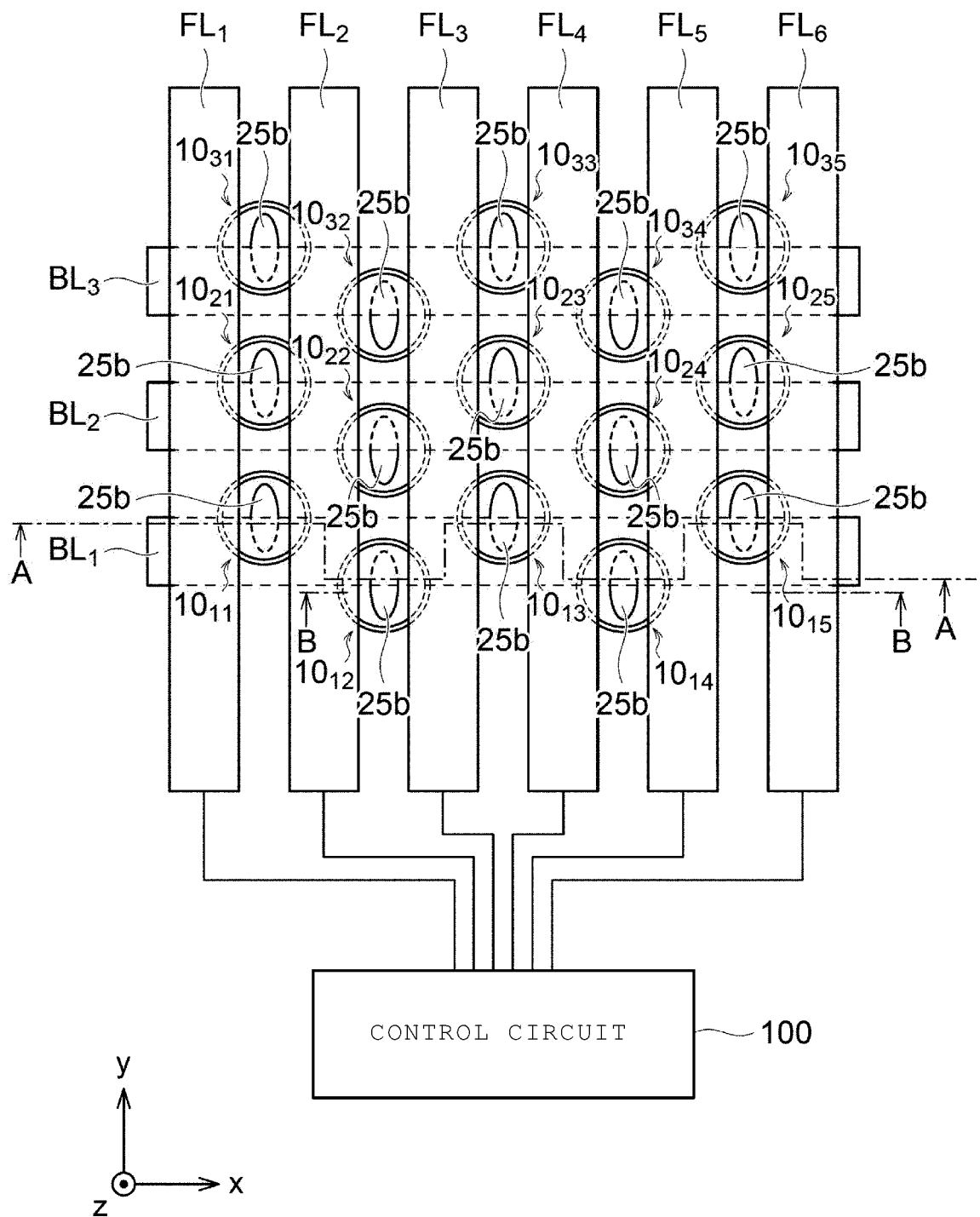
FIG. 1 is a plan view of a magnetic memory according to a first embodiment.

Embodiments provide a magnetic memory capable of limiting power consumption of a field line to a lower level.

In general, according to one embodiment, a magnetic memory includes a plurality of first magnetic members each extending along a first direction and including a first end portion and a second end portion. A first wiring and a second wiring are provided on a side closer to the second end portions of the first magnetic members, spaced apart from the first magnetic members, extend along a second direction intersecting the first direction, and disposed adjacent to each other in a third direction intersecting the first direction and the second direction. At least one of the first magnetic members is positioned between the first wiring and the second wiring in a plan view seen from the first direction. A second magnetic member includes a first portion facing a first side surface of the first wiring and electrically connected to one of the first magnetic members on a side closer to the first side surface, and a second portion facing a second side surface of the first wiring on a side opposite to the first side surface and electrically connected to another one of the first magnetic members on a side closer to the second side surface. A control circuit is electrically connected to the first wiring and the second wiring. The control circuit is configured to cause a current to flow through one of the first wiring or the second wiring when data is written into the first magnetic member that is positioned between the first wiring and the second wiring in the plan view.

Hereinafter, certain example embodiments will be described with reference to the drawings. The present disclosure is not to limited to these specific examples. In the following description, the described "vertical direction" of a magnetic memory may be different from the vertical direction set according to a gravitational acceleration direction or the like. Furthermore, the provided drawings are schematic or conceptual, and the depicted proportions, ratios between components, dimensions and the like are not necessarily the same as those in actuality. In describing embodiments, those components substantially similar to those previously described with reference to a preceding embodiment or figure are denoted by the same reference numerals, and detailed description thereof may be appropriately omitted from subsequent descriptions.

First Embodiment

Figure 2:
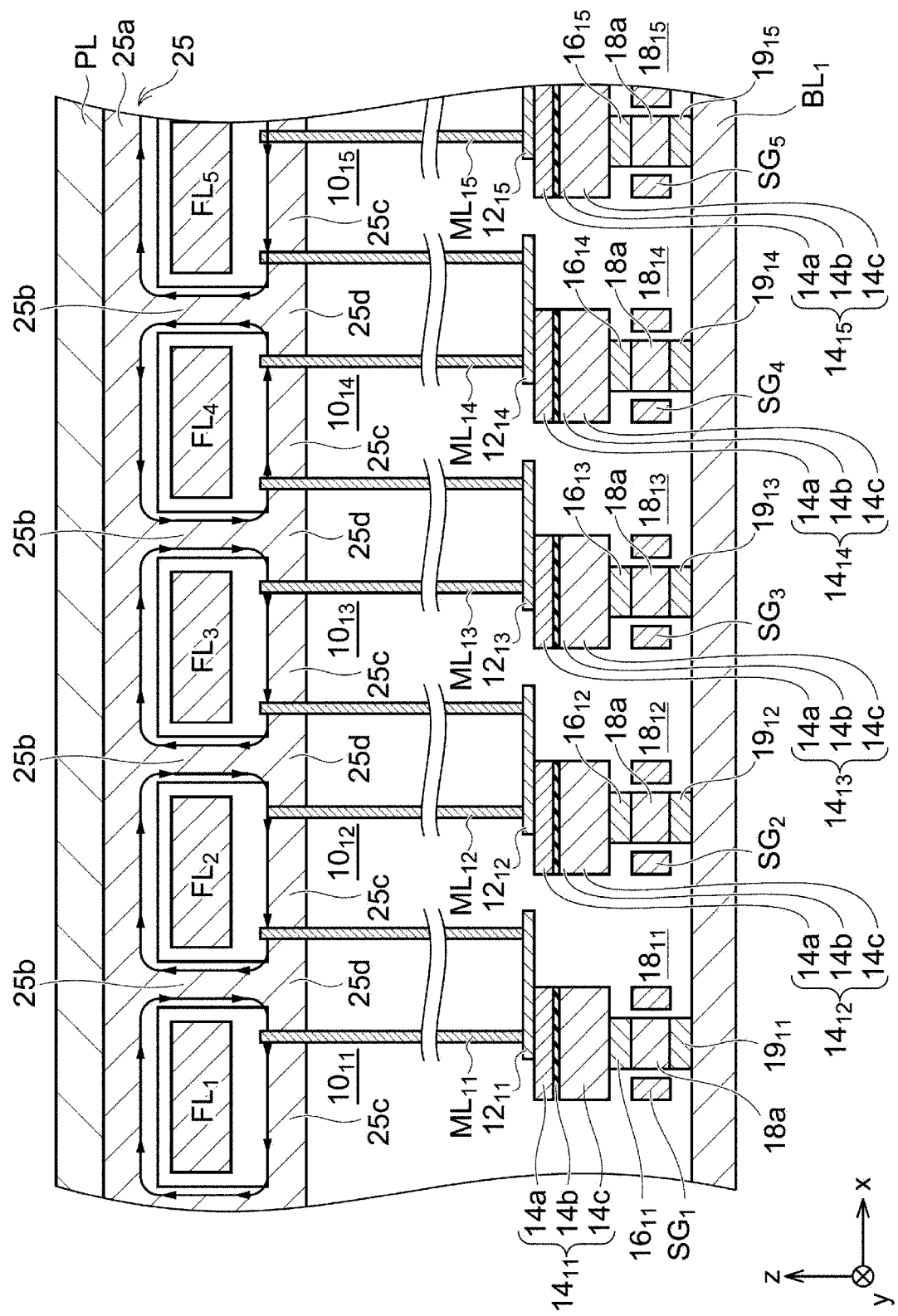
FIG. 2 is a cross-sectional view of a magnetic memory according to a first embodiment.

FIG. 1 is a plan view of a magnetic memory according to a first embodiment. FIG. 2 is a cross-sectional view taken along a cutting line A-A shown in FIG. 1. The magnetic memory according to the first embodiment includes memory units $10_{ij}$ (i=1 to m, j=1 to n) disposed in m rows and n columns, where m and n are natural numbers. FIG. 1 shows the memory units $10_{11}$ to $10_{35}$ arranged in three rows and five columns.

The memory units $10i1$ to $10$ in in the i-th row are disposed along a bit line $BL_i$ extending in an x-direction, and each have one end electrically connected to the bit line $BL_i$. In the present description, the expression "A and B are electrically connected to each other" means that A and B may be directly connected to each other or may be indirectly connected to each other via a conductor. In the i-th row, the memory units $10_{i1}$, $10_{i3}$, in odd-numbered columns and the memory units $10_{i2}$, $10_{i4}$, in even-numbered columns are shifted in the vertical page direction (y-direction) from one another. For example, the memory units $10_{i2}$, which are in an even-numbered column, are disposed between the memory units $10_{i1}$ and the memory units $10_{i3}$ and are shifted downward on the paper surface. By using such an arrangement, a plurality of memory units $10_{ij}$ can be more densely disposed and integrated.

Two field lines $FL_j$ and $FL_{j+1}$ are provided for the memory units $10_{ij}, \ldots 10_{mj}$ disposed in the j-th column. The field line $FL_{j+1}$ (j=1, ... n−1) is disposed above a region between the memory units $10_{ij}$ in the j-th column and the memory units $10_{ij+1}$ in the (j+1)-th column. In addition, the field line $FL_{j+1}$ may overlap a part of each memory unit $10_{ij}$ in the j-th column and overlap a part of each memory unit $10_{ij+1}$ in the (j+1)-th column.

The field line $FL_j$ is provided on a side closer to the second end portions $11b$ (FIG. 3) of magnetic members $ML_{ij-1}$ and $ML_{ij}$ and is disposed apart from the magnetic members $ML_{ij-1}$ and $ML_{ij}$. The field lines $FL_j$ extend along the y-direction intersecting a z-direction and are disposed adjacent to each other in the x-direction intersecting the z-direction and the y-direction. In a plan view seen from the z-direction, one magnetic member $ML_{ij}$ is positioned between the field lines $FL_j$ and $FL_{j+1}$.

For example, the field line $FL_2$ and the field line $FL_3$ are provided on either side of the memory units $10_{i2}$ disposed in the second column. The field line $FL_2$ is disposed above the region that is between the memory units $10_{i1}$ in the first column and the memory unit $10_{i2}$ in the second column. In addition, the field line $FL_2$ may overlap a part of each memory unit $10_{i1}$ in the first column and overlap a part of each memory unit $10_{i2}$ in the second column. Each field line $FL_j$ extends along the y-direction and intersects with each bit line $BL_i$. Each field line $FL_j$ is electrically connected to, and controlled by, the control circuit 100. In addition, each bit line $BL_i$ is also connected to, and controlled by, the control circuit 100. The control circuit 100 can selectively cause a current to flow through the field line $FL_j$.

As shown in FIG. 2, a yoke 25a is disposed above the memory units $10_{ij}$. The yoke 25a is also disposed above all the field lines $FL_1$ to $FL_{n+1}$. In addition, a plate electrode PL electrically connected to the yoke 25a contacts with an upper surface of the yoke 25a and covers this upper surface. A yoke 25b is provided between each two adjacent field lines $FL_j$ and connects the yoke 25a to a yoke 25d. A yoke 25c is provided below each field line $FL_j$ and is between each of two adjacent magnetic members $ML_{ij}$. The yoke 25d is provided on each magnetic member $ML_{ij}$ and is electrically connected to the corresponding magnetic member $ML_{ij}$.

The plate electrode PL is connected to, and controlled by, the control circuit 100. As a material of the yoke 25a (and the yokes 25b, 25c, and 25d), a conductive soft magnetic body material (for example, permalloy) or a material incorporating a conductive soft magnetic body may be used. In other examples, the material of the yokes 25a, 25b, 25c, and 25d may be a material having a granular structure in which magnetic particles are densely dispersed inside an insulator matrix. The yoke 25a may also serve as, or be integrated with, the plate electrode PL in some examples.

As shown in FIG. 2, each memory unit $10_{ij}$ includes a magnetic memory line $ML_{ij}$ (also referred to as a magnetic member $ML_{ij}$), a nonmagnetic conductive layer $12_{ij}$, a magnetoresistive element $14_{ij}$, a nonmagnetic conductive layer $16_{ij}$, a vertical thin film transistor $18_{ij}$, and a nonmagnetic conductive layer $19_{ij}$. The magnetic memory line $ML_{ij}$ is made of a conductive magnetic body.

Each magnetic member $ML_{ij}$ is made of a perpendicular magnetic material extending in the vertical direction in FIG. 2 (z-direction) and has a tubular shape.

Figure 3:
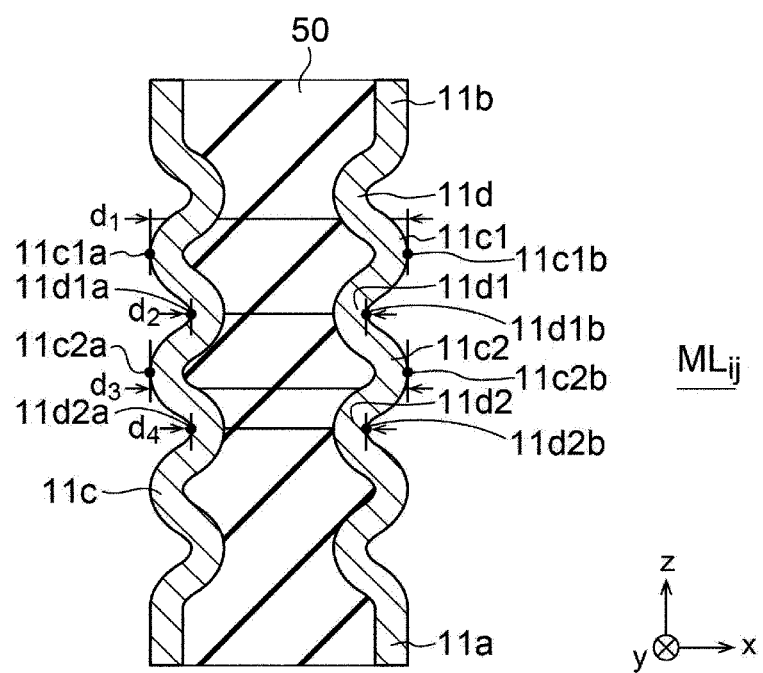
FIG. 3 is a cross-sectional view showing a configuration example of a magnetic member.

FIG. 3 is a cross-sectional view showing a configuration example of the magnetic members $ML_{ij}$. As shown in FIG. 3, each magnetic member $ML_{ij}$ includes a nonmagnetic insulator 50 filling the inside of a tube-like structure. That is, magnetic material of the magnetic member $ML_{ij}$ surrounds the nonmagnetic insulator 50. In the magnetic member $ML_{ij}$, as shown in FIG. 3, a region $11c1$, a neck portion $11d1$, a region $11c2$, and a neck portion $11d2$ are disposed along the z-direction. In FIG. 3, a distance in the x-direction (corresponding to a tube diameter) between an end portion $11c1a$ and an end portion $11c1b$ of the region $11c1$ is labeled distance d1, a distance in the x-direction (corresponding to a tube diameter) between an end portion $11d1a$ and an end portion $11d1b$ of the neck portion $11d1$ is labeled distance d2, a distance in the x-direction (corresponding to a tube diameter) between an end portion $11c2a$ and an end portion $11c2b$ of the region $11c2$ is labeled distance d3, and a distance in the x-direction (corresponding to a tube diameter) between an end portion $11d2a$ and an end portion $11d2b$ of the neck portion $11d2$ is labeled distance d4. The following conditions are satisfied for the magnetic members $ML_{ij}$:

$$d1 > d2$$

$$d1 > d4$$

$$d3 > d2$$

$$d3 > d4$$

The magnetic member $ML_{ij}$ has a first end portion $11a$ (FIG. 3) electrically connected to the magnetoresistive element $14_{ij}$ via the nonmagnetic conductive layer $12_{ij}$. The nonmagnetic conductive layer $12_{ij}$ may be omitted in some examples. In such a case, the first end portion $11a$ of the magnetic member $ML_{ij}$ can be directly connected to the magnetoresistive element $14ij$. Each magnetic member $ML_{ij}$ has a second end portion $11b$ (FIG. 3) electrically connected to the yoke 25d. The yokes 25d and the yokes 25c are magnetically connected. Here, the expression "A is magnetically connected to B" means that A and B constitute parts of a magnetic circuit, and also includes a case in which the magnetic bodies are not in direct contact with each other. The yokes 25c face the yoke 25a, and each of the field lines $FL_1, \ldots FL_{n+1}$ is disposed between the yoke 25a and a respective one of the yokes 25c. The yoke 25d is disposed between the upper ends of the tubes of each of the magnetic members $ML_{ij}$. The yokes 25d are in the same layer as the yokes 25c and are magnetically connected to yokes 25c. The yokes 25b are disposed between the yoke 25a and the yokes 25d. Each yoke 25b is electrically and magnetically connected to the yoke 25a and a yoke 25d. Therefore, the plate electrode PL is electrically connected in common to the memory units $10_{ij}$.

Figure 4:
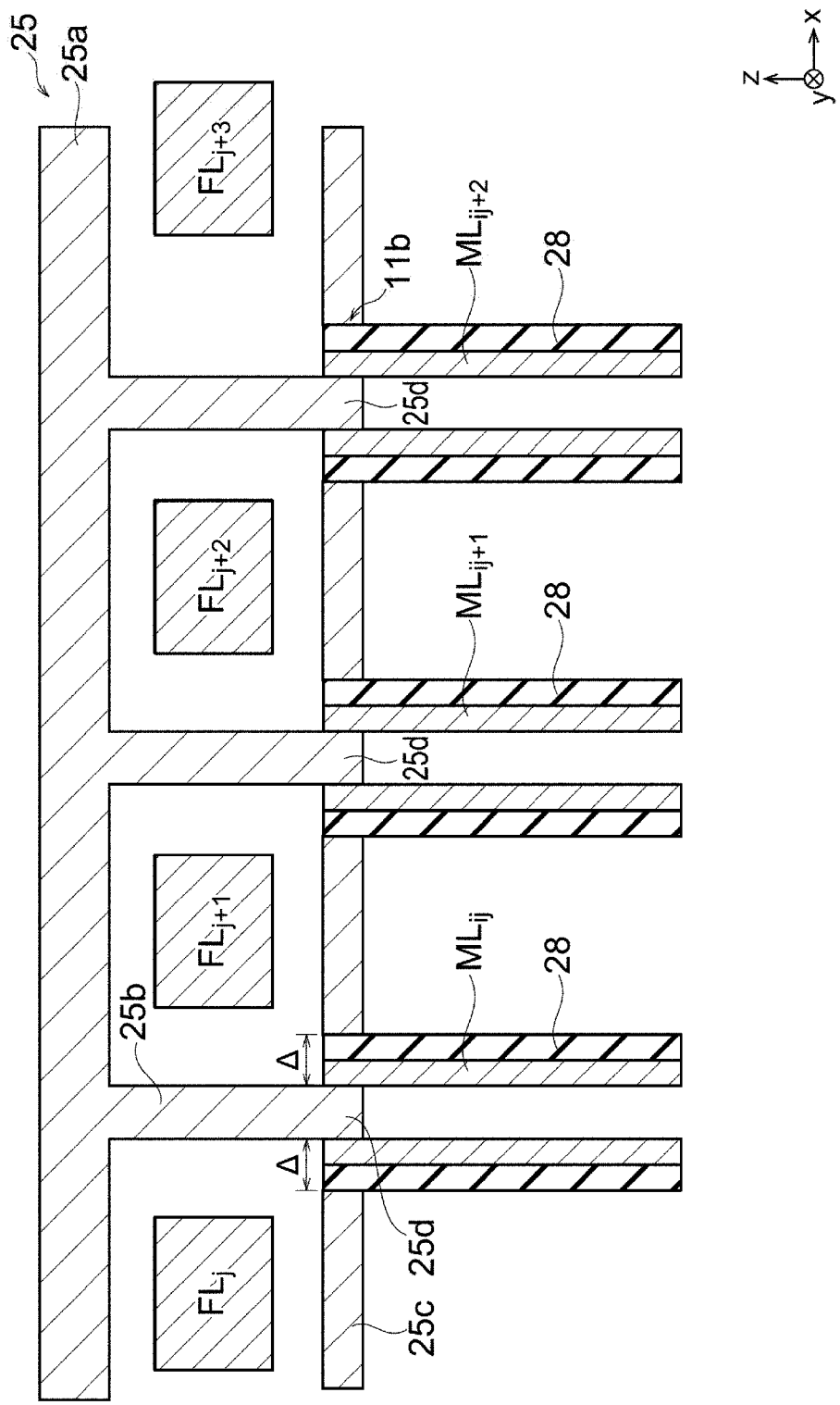
FIG. 4 is a cross-sectional view showing a configuration example of yokes, field lines, and magnetic members.

The yoke 25a, the yokes 25b, the yokes 25c, and the yokes 25d constitute a magnetic circuit 25. As shown in FIG. 4, one side surface of a yoke 25b faces the field line $FL_{j+1}$ and is electrically connected to the magnetic member $ML_{ij}$ on this side surface. The other side of the yoke 25b faces towards the field line $FL_j$.

The magnetic circuit 25 has a magnetic gap. For example, FIG. 4 is a cross-sectional view showing a configuration example of various yokes, field lines, and magnetic members. As shown in FIG. 4, each yoke 25b has one end connected to the yoke 25a and the other end connected to a respective one of the yokes 25d. Each yoke 25d is electrically connected to an inner surface of an upper end portion of a corresponding magnetic member $ML_{ij}$. As shown in FIG. 4, the outer surface of each magnetic member $ML_{ij}$ has a nonmagnetic insulating layer 28, and the yoke 25d is magnetically connected to an adjacent yoke 25c through an insulating layer 28. That is, as shown in FIG. 4, a sum of the thickness of each magnetic member $ML_{ij}$ in the x-direction and the thickness of the insulating layer 28 in the x-direction is a magnetic gap A.

The field lines $FL_j$ to $FL_{j+3}$ are provided on the side closer to second end portions 11b of the magnetic members $ML_{ij}$ to $ML_{ij+2}$, and are disposed apart from the magnetic members $ML_{ij}$ to $ML_{ij+2}$. The field lines $FL_j$ to $FL_{j+3}$ extend along the y-direction and are disposed adjacent to each other in the x-direction. In the plan view seen from the z-direction, the magnetic members $ML_{ij}$ to $ML_{ij+2}$ are positioned between the field lines $FL_j$ to $FL_{j+3}$. Although not shown in FIG. 4, the plate electrode PL is provided on the yoke 25a. In some examples, the yokes 25a to 25d may also be formed of a conductive magnetic material to function as bit lines.

In the plan view seen from the z-direction, one magnetic member ML is positioned between each of two field lines FL adjacent to each other among the field lines $FL_j$ to $FL_{j+3}$. The two field lines FL adjacent to each other share the yokes 25a and 25b. The yoke 25a is shared by all the field lines $FL_j$ to $FL_{j+3}$ in one row.

In the present embodiment, the control circuit 100 in FIG. 1 causes a current to flow through only the one of the two (left and right) field lines FL closest to the magnetic member ML into which data is to be written. In other words, the control circuit 100 causes the current to flow through just one field line FL, thereby writing the data into the end portions 11b of the two magnetic members ML on both sides of the field line FL in plan view. The writing forms a magnetic domain having a magnetization direction corresponding to the written data at the end portions 11b of these magnetic members ML.

Figure 5:
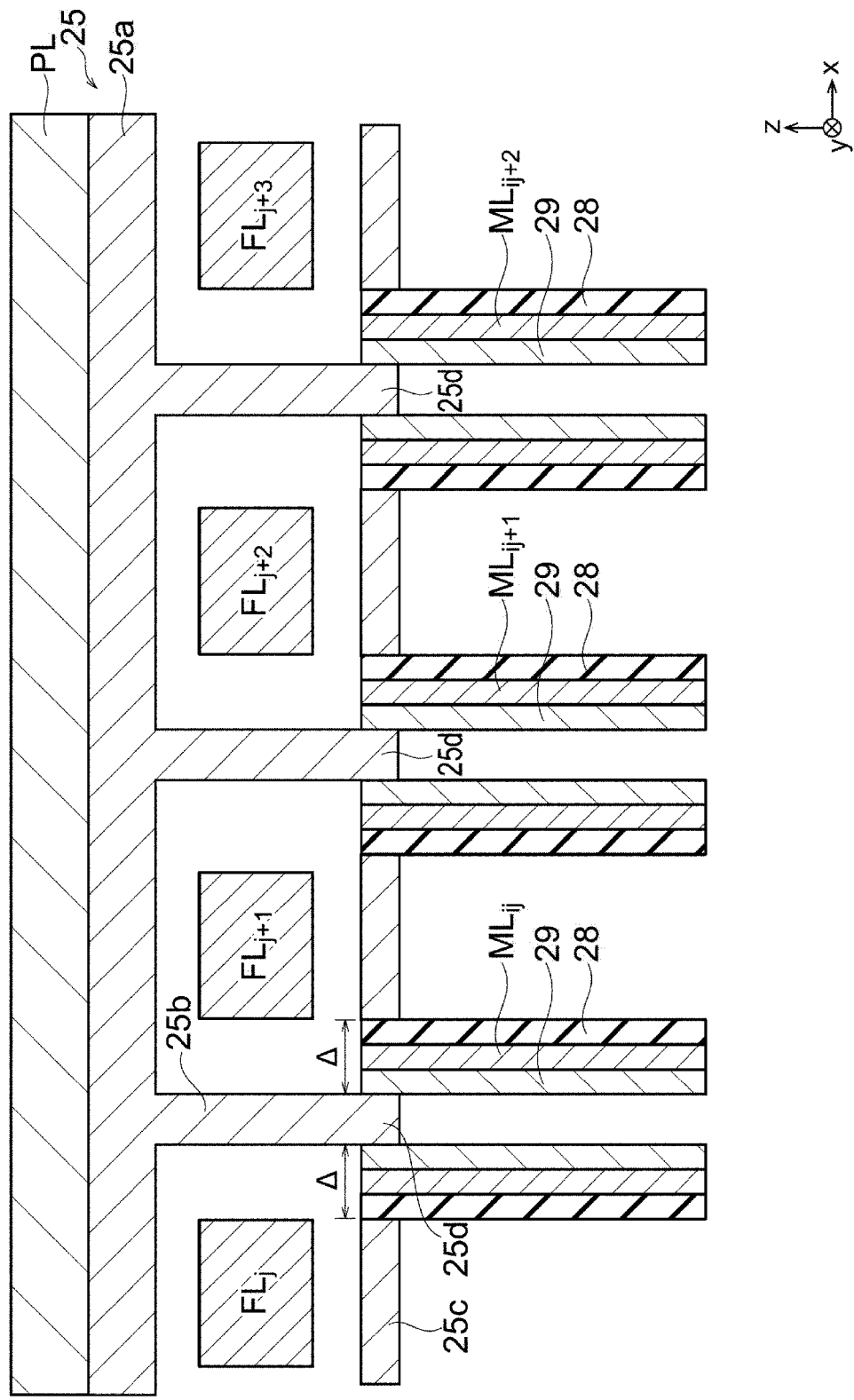
FIG. 5 is a cross-sectional view showing another configuration example of yokes, field lines, and magnetic members.

FIG. 5 is a cross-sectional view showing another configuration example. The magnetic gap A of the magnetic circuit 25 can also be configured as shown in FIG. 5. The case shown in FIG. 5 shows that a nonmagnetic conductive layer 29 is provided between each magnetic member $ML_{ij}$ and each yoke 25d in FIG. 4. The nonmagnetic conductive layer 29 is disposed on an inner surface of each magnetic member $ML_{ij}$ in the z-direction. In the case shown in FIG. 5, the magnetic gap A is a sum of the thickness of the nonmagnetic conductive layer 29 in the x-direction, the thickness of each magnetic member $ML_{ij}$ in the x-direction, and the thickness of the insulating layer 28 in the x-direction. In FIGS. 4 and 5, a nonmagnetic conductive layer may replace the insulating layer 28. In addition, each magnetic member $ML_{ij}$ may comprise a stacked structure with a magnetic layer (for example, CoFeB) and an insulating layer (for example, MgO). In this case, it is preferable that such an insulating layer is removed at the connection to the yoke 25d so the yoke 25d and this magnetic layer are brought into contact with each other to be electrically connected. However, such an insulating layer (MgO) can be an extremely thin layer, thus a leakage current may flow through this layer without significant hindrance. Therefore, removal insulating layer (MgO layer) may not be necessary in some examples.

In the first embodiment, as shown in FIG. 4, each magnetic member $ML_{ij}$ is electrically connected to the yokes 25b and 25d, but in other examples each magnetic member $ML_{ij}$ may also be electrically connected to the yoke 25c. In this case, the yoke 25c is preferably electrically connected to the yoke 25a at a location not depicted in FIG. 4. In some examples, a nonmagnetic layer may be provided between each magnetic member $ML_{ij}$ and at least one of the yoke 25d or the yoke 25c. Further, each magnetic member $ML_{ij}$ may be electrically connected to both the yoke 25d and the yoke 25c. In this case, a nonmagnetic conductive layer may be provided between each magnetic member $ML_{ij}$ and at least one of the yoke 25d or the yoke 25c.

Returning to FIG. 2 again, additional aspects of the magnetic memory according to the first embodiment will be described. The magnetoresistive element $14_{ij}$ reads information written in the magnetic member $ML_{ij}$, and is, for example, a magnetic tunnel junction (MTJ) element. Hereinafter, the magnetoresistive element $14_{ij}$ will be described as the MTJ element as one example. The MTJ element $14_{ij}$ includes a free layer 14a (magnetization free layer) having a variable magnetization direction, a fixed layer 14c (reference layer) having a fixed magnetization direction, and a nonmagnetic insulating layer 14b disposed between the free layer 14a and the fixed layer 14c. In the MTJ element $14_{ij}$, the free layer 14a is electrically connected to the first end portion 11a of the magnetic member $ML_{ij}$ (FIG. 3) via the corresponding nonmagnetic conductive layer $12_{ij}$, and the fixed layer 14c is electrically connected to the corresponding vertical thin film transistor $18_{ij}$ via the corresponding nonmagnetic conductive layer $16_{ij}$. Here, the expression "the magnetization direction is variable" means that the magnetization direction can be changed by application of a magnetic field from the corresponding magnetic member $ML_{ij}$ in a read operation, and the expression "the magnetization direction is fixed" means that the magnetization direction cannot be changed (in normal operation) by the magnetic field from the corresponding magnetic member $ML_{ij}$.

The vertical thin film transistor $18_{ij}$ includes a channel layer 18a extending in the z-direction and having one end electrically connected to the fixed layer 14c of the magnetoresistive element $14_{ij}$ via the nonmagnetic conductive layer $16_{ij}$ and the other end electrically connected to the bit line $BL_i$ via the nonmagnetic conductive layer $19_{ij}$, and a gate electrode portion $SG_j$ surrounding or sandwiching the channel layer 18a. That is, the gate electrode portion $SG_j$ covers at least a part of the channel layer. The channel layer 18a is made of, for example, crystalline silicon. The gate electrode portion $SG_j$ (j=1 to n) extends along the y-direction and is connected to, and controlled by, the control circuit 100 in FIG. 1.

By turning on the vertical thin film transistor $18_{ij}$, a current flows between the plate electrode PL and the bit line BL (shown in FIG. 2) via the magnetic member $ML_{ij}$. Accordingly, a magnetic domain formed as write data in the end portion 11b of the magnetic member $ML_{ij}$ is shifted in the z-direction within the magnetic member $ML_{ij}$, whereby the data is written into the magnetic member $ML_{ij}$. In addition, when the data is to be read, by turning on the vertical thin film transistor $18_{ij}$, a current flows between the plate electrode PL and the bit line BL via the magnetic member $ML_{ij}$. Accordingly, the magnetic domain corresponding to the written data is shifted to the end portion 11a in the z-direction, and magnetization of the free layer 14a of the magnetoresistive element $14_{ij}$ is set to a direction corresponding to the written data, whereby reading is performed.

As shown in FIG. 2, the yokes 25a, 25b, 25c, and 25d surround a part of each of the field lines $FL_1$ to $FL_{n+1}$. For example, the yoke 25a faces upper surfaces of the field lines and covers the upper surfaces. Each yoke 25c (also referred to as a return yoke 25c) faces a lower surface of a respective one of the field lines. Each yoke 25b is connected between the yoke 25a and a respective one of the yokes 25d and is disposed to one side of one of the field lines. The yoke 25a is disposed away from (separated from) the upper surfaces of the field lines. Each yoke 25b is disposed away from (separated from) a side surface of one of the field lines. Each yoke 25c is disposed away from (separated from) a lower surface of one of the field lines.

Writing Method

Figure 6:
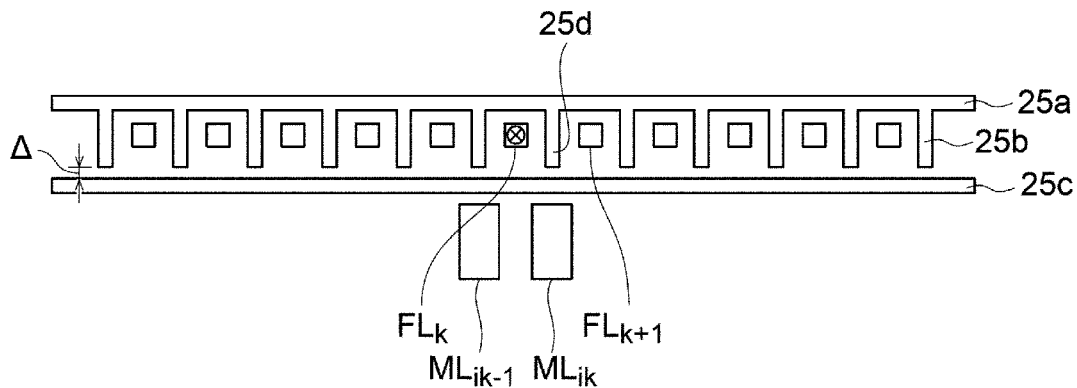
FIG. 6 is a diagram illustrating a writing operation of a magnetic memory.

Next, a writing method of the magnetic memory according to the first embodiment will be described with reference to FIG. 6. FIG. 6 is a diagram illustrating a writing operation in the magnetic memory. FIG. 6 shows a case in which data is written into a magnetic member $ML_{ik}$ of a memory unit $10_{ik}$ in the i-th row and the k-th column when i and k are positive integers. In this case, the data is written by causing a writing current to flow through one field line (field line $FL_k$) positioned on an upper left side of the memory unit $10_{ik}$. For example, a writing current flowing into the page flows through the field line $FL_k$. At this time, no writing current in a reverse direction (from the back side to the front side) flows to field line $FL_{k+1}$ positioned on an upper right side of the memory unit $10_{ik}$.

Figure 7:
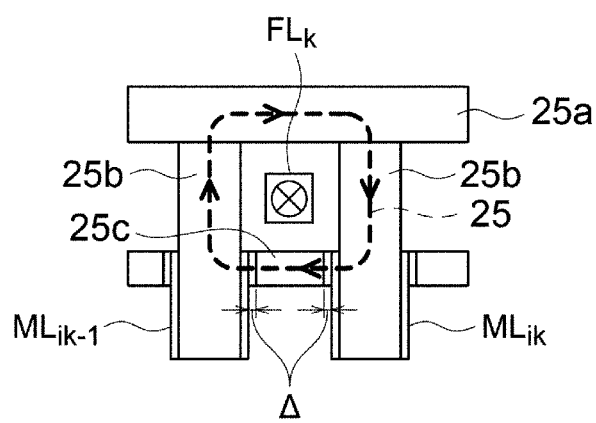
FIG. 7 is a schematic diagram illustrating writing performed by causing a writing current to flow through a field line.

FIG. 7 is a schematic diagram illustrating a case in which the writing is performed by causing a writing current of, for example, 2 mA to flow through the field line $FL_k$ shown in FIG. 6. In this case, the yoke 25b on the magnetic member $ML_{ik}$, the yoke 25a, the yoke 25b on the magnetic member $ML_{ik-1}$, and the yoke 25c between the magnetic member $ML_{ik-1}$ and the magnetic member $ML_{ik}$ form a magnetic circuit 25 as indicated by a broken line in FIG. 7. In the magnetic circuit 25, the magnetic gap A is provided between the yoke 25c and the magnetic member $ML_{ik}$, and the magnetic gap A is also provided between the yoke 25c and the magnetic member $ML_{ik-1}$. When a length of each of these magnetic gaps $\Delta$ is represented as L and a current value passing through the magnetic circuit 25 is represented as I, a magnetic field intensity H in these magnetic gaps $\Delta$ is $H=I/(2L)$ according to Ampere's law. Since I=2 mA in this example, $H=2$ mA/(2L). In this discussion, magnetic resistances of the yokes 25a, 25b, and 25c in the magnetic circuit 25 can be regarded as 0.

Figure 8:
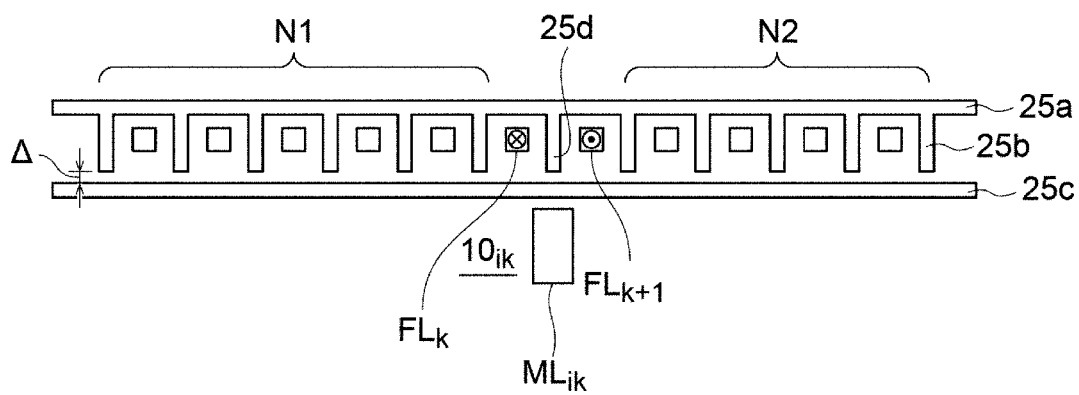
FIG. 8 is a schematic diagram showing a comparative example in which writing currents having the same magnitude but different directions flow through two adjacent field lines.
Figure 9:
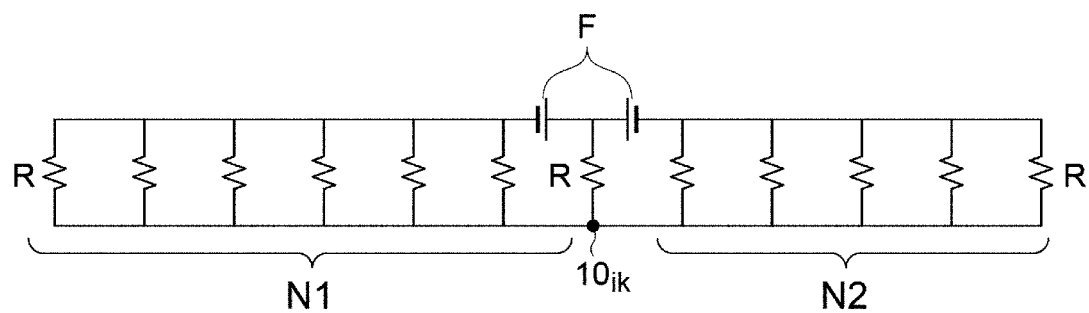
FIG. 9 is a diagram showing a magnetic circuit related to a comparative example.

FIG. 8 is a schematic diagram showing a comparative example of a case in which writing currents having the same magnitude but different directions flow through the two adjacent field lines (field line $FL_k$ and field line $FL_{k+1}$). FIG. 9 is a diagram showing a magnetic circuit for the case depicted in FIG. 8. Since the writing currents having the same magnitude but different directions flow through the field line $FL_k$ and the field line $FL_{k+1}$, magnetomotive forces F in reverse directions are generated on left and right sides of the writing memory unit $10_{ik}$. Since the magnetic gap A is provided between each yoke 25b and the return yoke 25c, each magnetic gap A serves as a magnetic resistance R.

In FIG. 9, in a circuit on the left side of the writing memory unit $10_{ik}$, N1 magnetic resistances R are connected in parallel, and thus a combined magnetic resistance is R/N1. In a circuit on the right side of the writing memory unit $10_{ik}$, N2 magnetic resistances R are connected in parallel, and thus the combined magnetic resistance is R/N2. That is, the magnetic circuit shown in FIG. 9 corresponds to an equivalent magnetic circuit shown in FIG. 10. In the equivalent magnetic circuit of FIG. 10, two magnetomotive forces F are connected in parallel.

Figure 10:
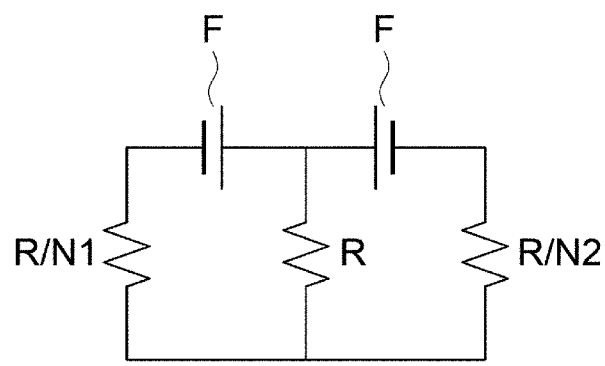
FIG. 10 is a diagram showing an equivalent magnetic circuit for the magnetic circuit of the comparative example.

FIG. 10 is a diagram showing the equivalent magnetic circuit of the magnetic circuit in FIG. 9. In FIG. 10, when N1 and N2 are both assumed to be large, the combined resistances R/N1 and R/N2 are smaller than the magnetic resistances R in the writing memory unit $10_{ik}$, and a magnetic flux ($\varphi$) flowing through the magnetic circuit 25 due to the two magnetomotive forces F connected in parallel is F/R.

Figure 11:
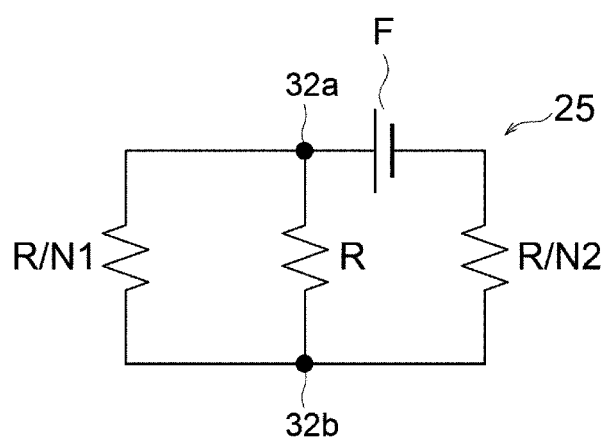
FIG. 11 is a diagram of an equivalent magnetic circuit in a case of causing a writing current to flow through a field line.

In comparison, FIG. 11 is a diagram of an equivalent magnetic circuit in the case in which the writing current flows through just one field line as according to the first embodiment. FIG. 11 shows the equivalent magnetic circuit in the case where the writing current flows through the field line $FL_k$ but no writing current flows through the other field line ($FL_{k+1}$) in FIG. 6.

In FIG. 11, when N1 and N2 are both assumed to be large, the combined resistances R/N1 and R/N2 are smaller than the magnetic resistances R in the writing memory unit $10_{ik}$, and a magnetic flux (p) flowing through the magnetic circuit 25 due to the magnetomotive force F is also F/R. Therefore, even though the current flows through only the field line $FL_k$, a magnetic field similar to that in the case of the comparative example of FIG. 10 is obtained as well. That is, when the writing current flowing through the field line $FL_k$ does not cause magnetic saturation, the control circuit 100 can sufficiently execute the data writing with only the field line $FL_k$. Accordingly, the magnetic memory according to the first embodiment can execute the writing operation with a small writing current. In FIG. 11, the combined resistance R/N1 is smaller than the magnetic resistances R of the magnetic circuit 25, and the combined resistance between terminals 32a and 32b of the magnetic resistance R in the writing memory unit $10_{ik}$ is reduced. Therefore, a large magnetic flux (o) flows through a yoke corresponding to the writing memory unit $10_{ik}$, which may cause magnetic saturation. Here, it is assumed that the yoke has ideal magnetic properties and does not cause magnetic saturation. Alternatively, the numbers for N1 and N2 can be limited to a range within which the yoke is not saturated and the operation can be performed without causing saturation of the magnetic flux.

In this way, according to the first embodiment, as shown in FIG. 6, when the data is to be written into the magnetic member $ML_{ik}$ positioned between the field line $FL_k$ and the field line $FL_{k+1}$ in the plan view (seen from the z-direction), the control circuit 100 causes the current to flow through only the field line $FL_k$. Accordingly, since the magnetic memory writes the data into the magnetic member $ML_{ik}$ by using only the current flowing through the field line $FL_k$, the power consumption can be limited to a lower level as compared to the comparative example. A large magnetic field can be generated in the magnetic circuit 25 even when the writing current flowing through the field line $FL_k$ is less than a current that causes magnetic saturation, whereby the data can be written sufficiently. In some examples, control circuit 100 may cause the current to flow through only the field line $FL_{k+1}$ instead of the field line $FL_k$. This may be advantageous in some instances because by causing the current to flow through the field line $FL_{k+1}$, a magnetic field can also be generated in the yoke 25d directly above the magnetic member $ML_{ik}$, similarly to the field line $FL_k$.

Second Embodiment

Figure 12:
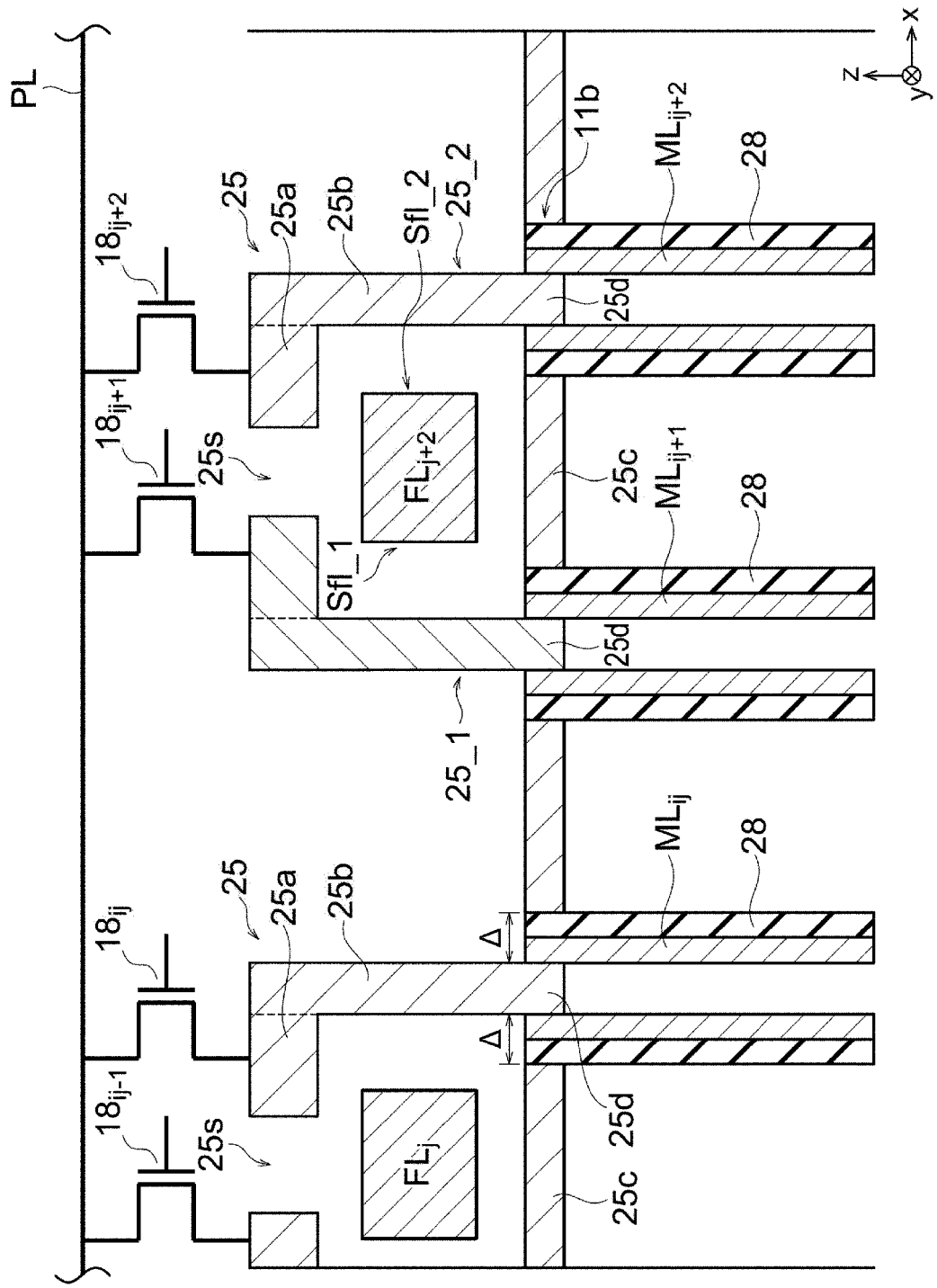
FIG. 12 is a diagram showing a configuration example of yokes, field lines, and magnetic members according to a second embodiment.
Figure 13:
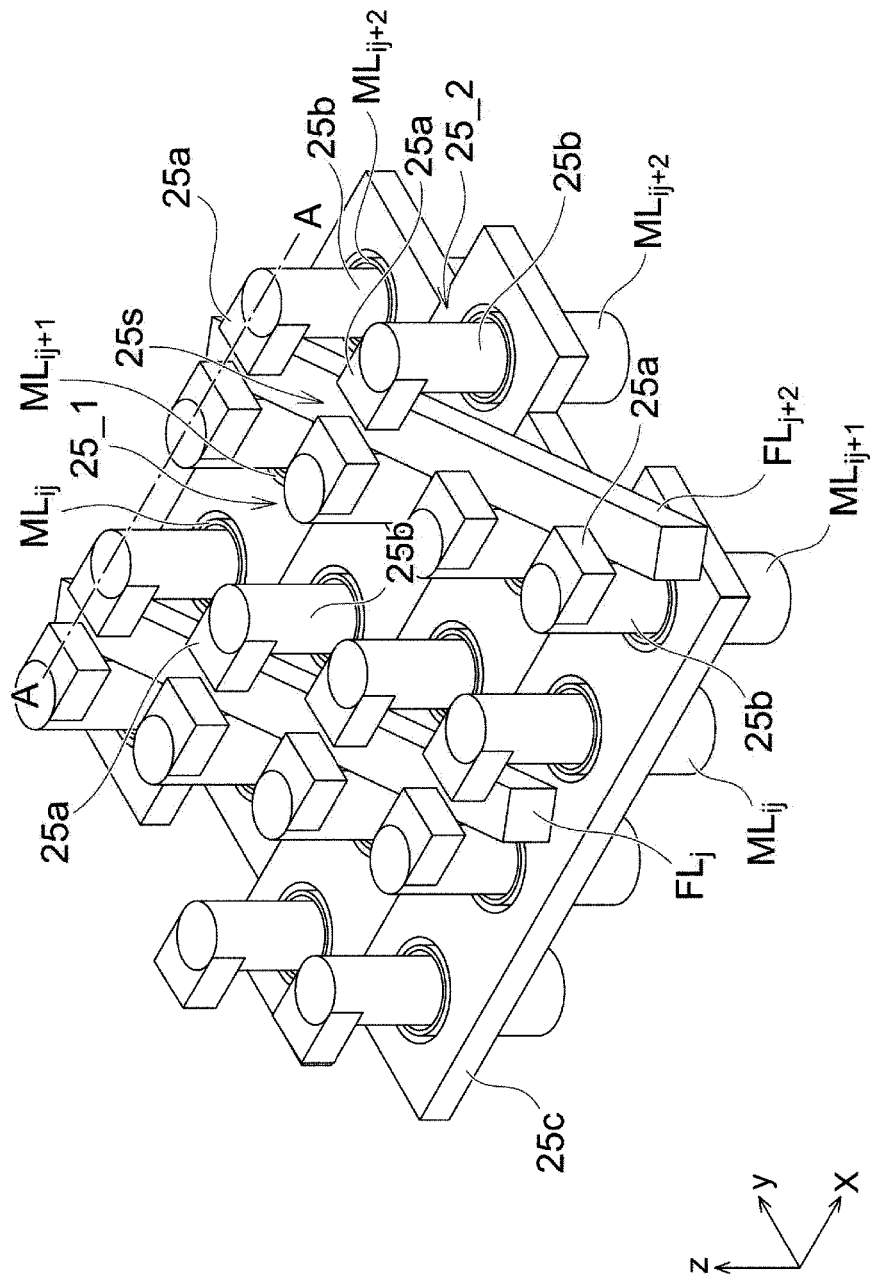
FIG. 13 is a perspective view of a configuration example of yokes, field lines, and magnetic members according to a second embodiment.

FIG. 12 is a diagram showing a configuration example according to a second embodiment. FIG. 13 is a perspective view showing the configuration example according to the second embodiment. FIG. 12 shows a cross section taken along a line A-A in FIG. 13.

In the second embodiment, the field lines FL are not disposed in each two adjacent magnetic members ML but are intermittently disposed in the plan view seen from the z-direction. That is, the field lines $FL_j$ and $FL_{j+2}$ in FIG. 4 are provided, but the field lines $FL_{j+1}$ and $FL_{j+3}$ are not provided. In this case, in the plan view direction, two magnetic members $ML_{ij}$ and $ML_{ij+1}$ are seen positioned between the adjacent field lines $FL_j$ and $FL_{j+2}$. For example, the magnetic member $ML_{ij}$ is on a side closer to the field line $FL_j$. The magnetic member $ML_{ij+1}$ is on a side closer to the other side surface of the field line $FL_{j+2}$. The magnetic member $ML_{ij+2}$ is on a side of the field line $FL_{j+2}$ opposite of the field line $FL_j$. Although not specifically depicted, a magnetic member $ML_{ij+3}$ is adjacent to the magnetic member $ML_{ij+2}$ in the same row. Each yoke 25a is electrically connected to a respective one of the magnetic members $ML_{ij}$ to $ML_{ij+3}$. Each yoke 25b is also electrically connected to a respective one of the magnetic members $ML_{ij}$ to $ML_{ij+3}$. Each yoke 25d is also electrically connected to a respective one of the magnetic members $ML_{ij}$ to $ML_{ij+3}$. In this way, the directly adjacent field lines FL do not share the same magnetic member ML or the yokes 25a, 25b, and 25d, but are individually provided with corresponding magnetic members ML and yokes 25a, 25b, and 25d.

Accordingly, the yokes 25a, 25b, and 25d are provided on each side of each of the field lines $FL_j$ and $FL_{j+2}$. That is, yokes 25a, 25b, and 25d provided for the field line $FL_j$ and yokes 25a, 25b, and 25d provided for the field line $FL_{j+2}$ are electrically separated from one another. In addition, in each of the yokes 25a, 25b, and 25d, the yokes 25a, 25b, and 25d around the field lines $FL_j$ and $FL_{j+2}$ are divided into two parts and electrically separated from one another by a slit 25s. The yokes 25c (return yokes) are provided in common (shared) for a plurality of magnetic members ML.

The two adjacent yokes 25a around the field line $FL_{j+2}$ are electrically separated from each other. The two adjacent yokes 25b around the field line $FL_{j+2}$ are also electrically separated from each other. The two adjacent yokes 25d around the field line $FL_{j+2}$ are also electrically separated from each other. The yokes 25a, 25b, and 25d provided on one side of the field line $FL_{j+2}$ are referred to as a first yoke portion 25_1, and the yokes 25a, 25b, and 25d provided on the other side of the field line $FL_{j+2}$ are referred to as a second yoke portion 25_2. The first yoke portion 25_1 faces a side surface Sfl_1 of the field line $FL_{j+2}$ and is electrically connected to the magnetic member $ML_{ij+1}$ on a side closer to the side surface Sfl_1. The second yoke portion 25_2 faces a side surface Sfl_2 of the field line $FL_{j+2}$ on a side opposite to the side surface Sfl_1 and is electrically connected to the other magnetic member $ML_{ij+2}$ on a side closer to the side surface Sfl_2.

The slit 25s is provided in the yokes 25a above the field line $FL_{j+2}$. The yokes 25a are positioned farther from the magnetic members $ML_{ij+1}$ and $ML_{ij+2}$ than is the field line $FL_{j+2}$, and are electrically separated from each other by the slit 25s. On the other hand, the first yoke portion 25_1 and the second yoke portion 25_2 are magnetically connected, and constitute a magnetic circuit which may be referred to as a whole yoke 25. A conductive soft magnetic body (for example, permalloy) or a material incorporating a conductive soft magnetic body may be used as the material for the yokes 25a to 25d.

The yoke 25c (return yoke) is disposed at a position closer in the z-direction to the magnetic members $ML_{ij+1}$ and $ML_{ij+2}$ than is the field line $FL_{j+2}$. The yoke 25c is electrically separated from the first yoke portion 25_1 and the second yoke portion 25_2 by the insulating layer 28.

As shown in FIG. 12, transistors $18_{ij+1}$ and $18_{ij+2}$ operating as switching elements are provided above the first yoke portion 25_1 and the second yoke portion 25_2, respectively. The transistor $18_{ij+1}$ is connected between the plate electrode PL and the first yoke portion 25_1, which is connected to the end portion 11b of the magnetic member $ML_{ij+1}$. The transistor $18_{ij+2}$ is connected between the plate electrode PL and the second portion 25_2, which is connected to the end portion 11b of the magnetic member $ML_{ij+2}$. Gates of the transistors $18_{ij+1}$ and $18_{ij+2}$ are connected to the control circuit 100 and receive a control signal from the control circuit 100. The transistors $18_{ij+1}$ and $18_{ij+2}$ are brought into a conductive state (ON) or a non-conductive state (OFF) according to the control signal from the control circuit 100.

The transistors $18_{ij+1}$ and $18_{ij+2}$ respectively function as switching elements (also referred to as selectors) used to select the magnetic member $ML_{ij+1}$ or $ML_{ij+2}$ through which a writing current or a reading current is to flow. Therefore, when the current is to selectively flow through the magnetic member $ML_{ij+1}$, the control circuit 100 turns on the transistor $18_{ij+1}$ and keeps the other transistor $18_{ij+2}$ and the like off. When the current is to selectively flow through the magnetic member $ML_{ij+2}$, the control circuit 100 turns on the transistor $18_{ij+2}$ and keeps the other transistor $18_{ij+1}$ and the like off.

The yokes 25a to 25d and the transistors $18_{ij-1}$ and $18_{ij}$ corresponding to the other field line $FL_j$ have the same configuration and function in the same manner. The first yoke portion 25_1 and the second yoke portion 25_2 provided corresponding to the field line $FL_j$ are electrically separated from the first yoke portion 25_1 and the second yoke portion 25_2 provided corresponding to the field line $FL_{j+2}$ adjacent to the field line $FL_j$.

In this way, according to the second embodiment, the field lines FL can be intermittently disposed between the adjacent magnetic members ML. Therefore, since the number of the field lines FL is reduced, a density of the magnetic members ML can be increased. In addition, in the second embodiment, since no magnetic resistances are connected in parallel in an equivalent magnetic circuit, the problem of magnetic saturation described above in the context of the first embodiment does not occur.

The yokes 25a to 25d are provided corresponding to each field line FL, and are divided into the first yoke portion 25_1 and the second yoke portion 25_2 corresponding to each of two magnetic members ML on both sides of the field line FL. Since the first yoke portion 25_1 and the second yoke portion 25_2 are electrically separated from each other, the transistors $18_{ij-1}$ and $18_{ij}$, functioning as selection elements, can be moved from a location nearer the first end portion (the side closer to 11a in FIG. 3) of a magnetic members ML as shown in FIG. 2 to a location nearer the second end portion 11b as shown in FIG. 12. That is, the transistors $18_{ij-1}$ and $18_{ij}$ can be moved from a side closer to the MTJ element $14_{ij}$ to a side closer to the field line FL. Accordingly, an additional degree of freedom in device design layout for the magnetic memory of the second embodiment is increased.

By forming the transistors 18 and the MTJ elements 14 on separate semiconductor substrates and bonding these semiconductor substrates to each other, a process for manufacturing the transistors 18 and a process for manufacturing the MTJ elements 14 can be separated. Therefore, typical heat treatments utilized in a process for fabricating transistors 18 will not have to be executed on the MTJ elements 14, and thus deterioration of the MTJ elements 14 due to exposure to heat during fabrication can be reduced.

Other configurations and operations in the second embodiment may be the same as the configurations and the operations in the first embodiment. As shown in FIG. 2, each magnetoresistive element 14 is provided corresponding to a respective one of the magnetic members ML, and one end thereof is electrically connected to the first end portion 11$a$ of the magnetic member ML.

In a writing operation, when data is to be written into the magnetic member $ML_{ij+1}$ positioned on one side of the field line $FL_{j+2}$, the control circuit 100 causes a current to flow through the field line $FL_{j+2}$ and turns on the transistor $18_{ij+1}$. Accordingly, a magnetic field is generated in the magnetic circuit 25 constituted by the yokes 25$a$ to 25$d$ by only the current flowing through the field line $FL_{j+2}$. The current flows between the plate electrode PL and the bit line BL shown in FIG. 2 via the magnetic member $ML_{ij+1}$. Accordingly, the data can be written into the magnetic member $ML_{ij+1}$. In this process, the current flows through just the field line $FL_{j+2}$, and no current flows through the other field lines $FL_j$. That is, the control circuit 100 can cause the current to flow through field line $FL_{j+2}$ for writing the data into either of the magnetic members $ML_{j+1}$ and $ML_{j+2}$ positioned on the sides of the field line $FL_{j+2}$ in the plan view seen from the z-direction. Therefore, the power consumption can be limited to a lower level. On the other hand, although the field lines FL are intermittently disposed, a uniformity of the magnetic field generated in the magnetic circuit 25 constituted by the yokes 25$a$ to 25$d$ is not lost, and the magnetic field is not weakened.

For example, when data is to be written into the magnetic member $ML_{ij+2}$ positioned on a side of the field line $FL_{j+2}$, the control circuit 100 causes a current to flow through the field line $FL_{j+2}$ and turns on the transistor $18_{ij+2}$. Accordingly, a magnetic field is generated in the magnetic circuit 25 constituted by the yokes 25$a$ to 25$d$ by only the current flowing through the field line $FL_{j+2}$. Further, the current flows between the plate electrode PL and the bit line BL shown in FIG. 2 via the magnetic member $ML_{ij+2}$. Accordingly, the data can be written into the magnetic member $ML_{ij+2}$. At this time, since the current flows through just the one field line $FL_{j+2}$, the power consumption can be limited to a lower level.

When the data is to be written into the magnetic member $ML_{ij}$, the control circuit 100 may cause the current to flow through any field line FL corresponding to the magnetic member $ML_{ij}$.

In the second embodiment, the field lines FL are not disposed between each pair of two adjacent magnetic members ML but are disposed intermittently (e.g., every other adjacent pair). However, in other examples, the field lines FL may also be disposed between each pair of two adjacent magnetic members ML as in the first embodiment, and the writing current may intermittently flow through the field lines FL. In this case, the same operation as that of the second embodiment can be executed as well, and the same effect as that of the second embodiment can be achieved.

Third Embodiment

Figure 14:
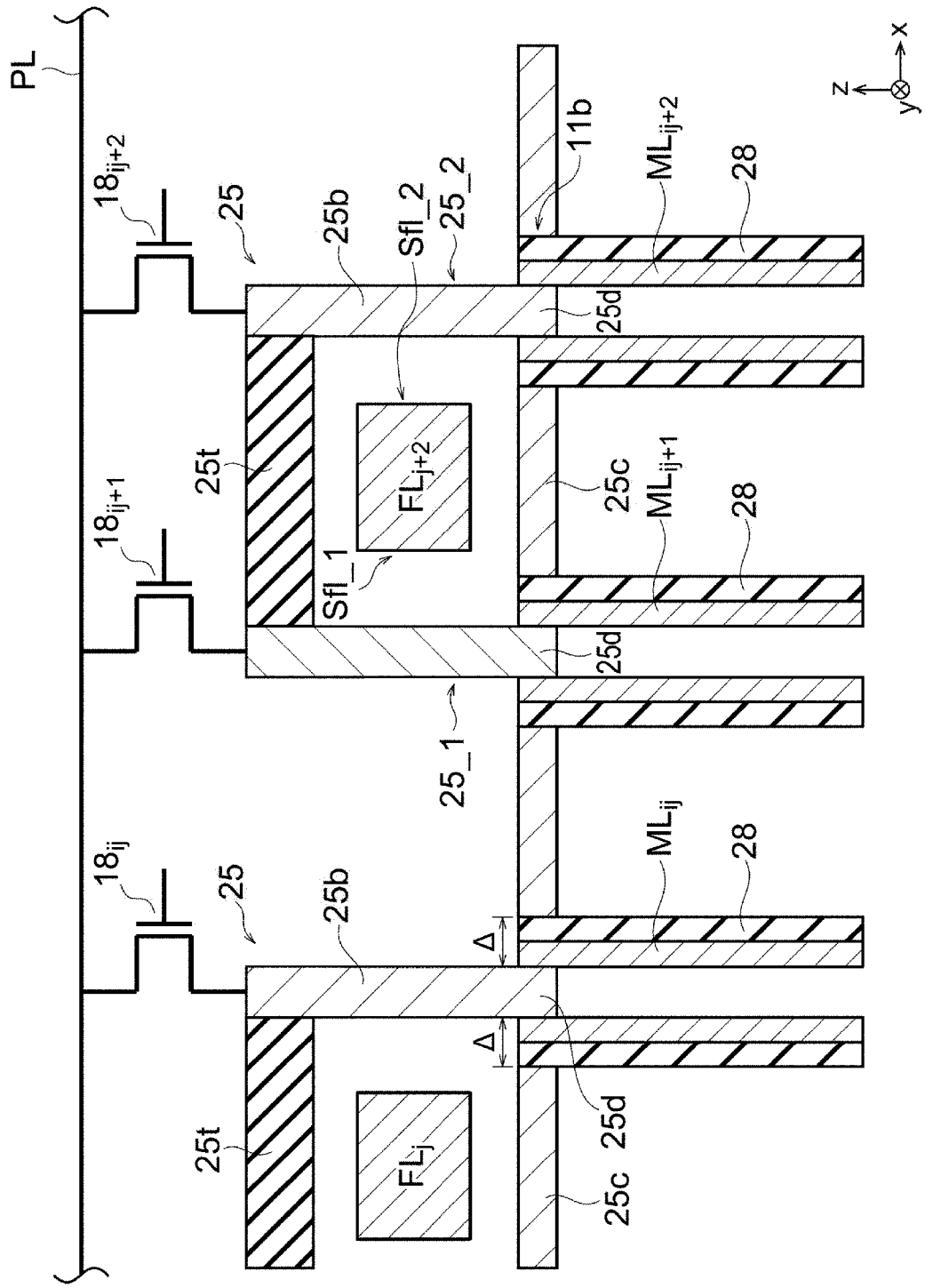
FIG. 14 is a diagram showing a configuration example of yokes, field lines, and magnetic members according to a third embodiment.
Figure 15:
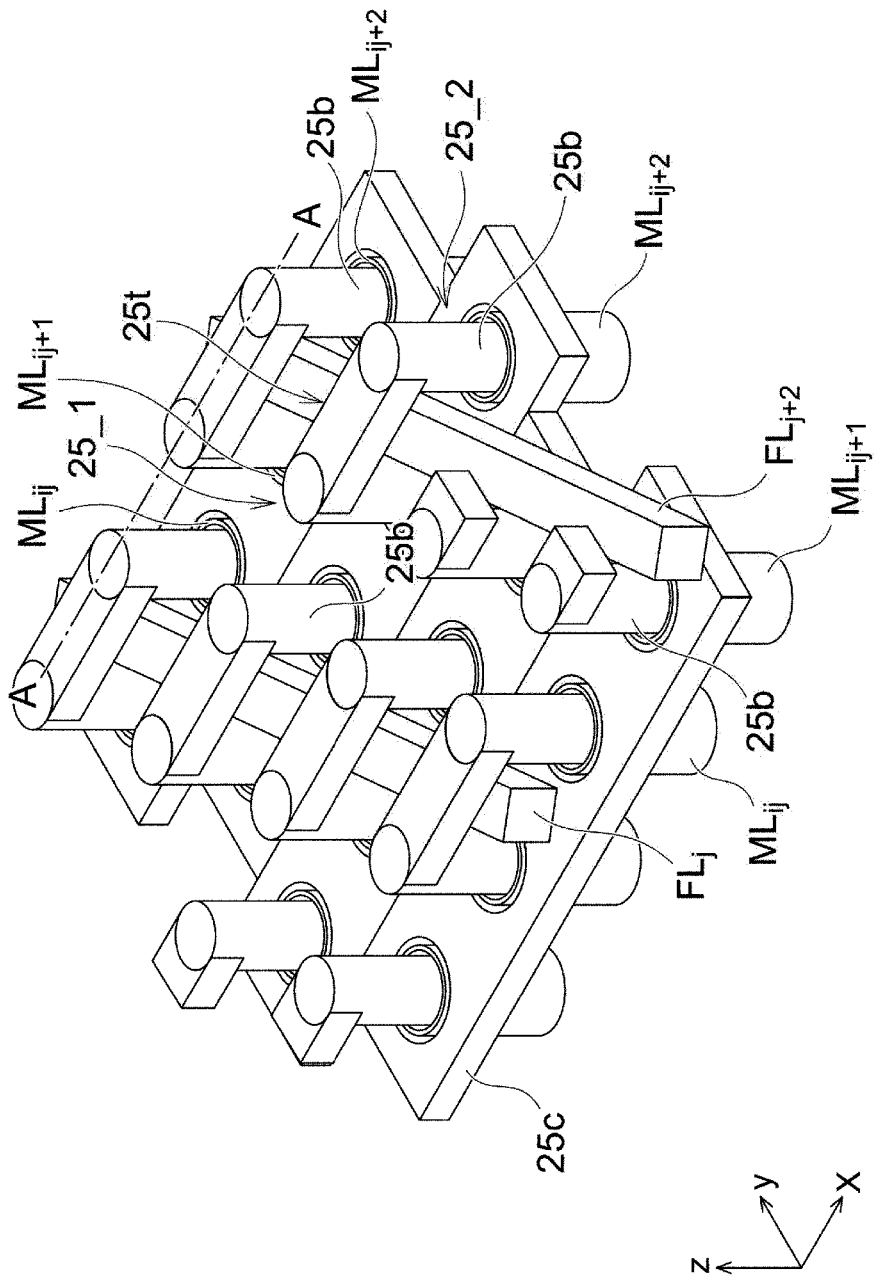
FIG. 15 is a perspective view of a configuration example of yokes, field lines, and magnetic members according to a third embodiment.

FIG. 14 is a diagram showing a configuration example according to a third embodiment. FIG. 15 is a perspective view showing the configuration example according to the third embodiment. FIG. 14 shows a cross section taken along a line A-A in FIG. 15.

In the third embodiment, a configuration of the field lines FL, the yokes 25$b$, 25$c$, and 25$d$, and the transistors 18 may be considered to be the same as the configuration in the second embodiment unless otherwise noted.

However, in the third embodiment, magnetic members 25$t$ are provided above the field lines FL instead of the yokes 25$a$. Each magnetic member 25$t$ is provided between the yokes 25$b$ adjacent to each other above a respective one of the field lines FL. That is, each magnetic member 25$t$ physically connects the yokes 25$b$ adjacent to each other above a respective one of the field lines FL. However, for example, an insulating soft magnetic material such as ferrite is used for the magnetic members 25$t$. Therefore, the first yoke portion 25_1 and the second yoke portion 25_2 are electrically separated from each other but are magnetically connected to each other, similar to the second embodiment but without use of a slit 25$s$ or the like. In this way, a magnetic member 25$t$ may be provided between the yokes 25$b$ rather than a yoke 25$a$ and slit 25$s$.

In this case, each transistor 18 is connected to a yoke 25$b$ and the plate electrode PL.

By providing the magnetic members 25$t$ (which does not require incorporation of a 25$s$), concentration of the magnetic field in the slit 25$s$ can be prevented. Therefore, the magnetic field can be more concentrated in the magnetic gap A between the yoke 25$c$ and the yoke 25$b$, and a magnetic field stronger than that in the second embodiment can be applied to the end portion 11$b$ of the magnetic member ML. In addition, in the third embodiment, similar to the second embodiment, the problem of magnetic saturation does not occur either.

Other configurations and operations in the third embodiment may be the same as the configurations and the operations in the second embodiment. Accordingly, the third embodiment can achieve the same effect as that of the second embodiment.

Fourth Embodiment

Figure 16:
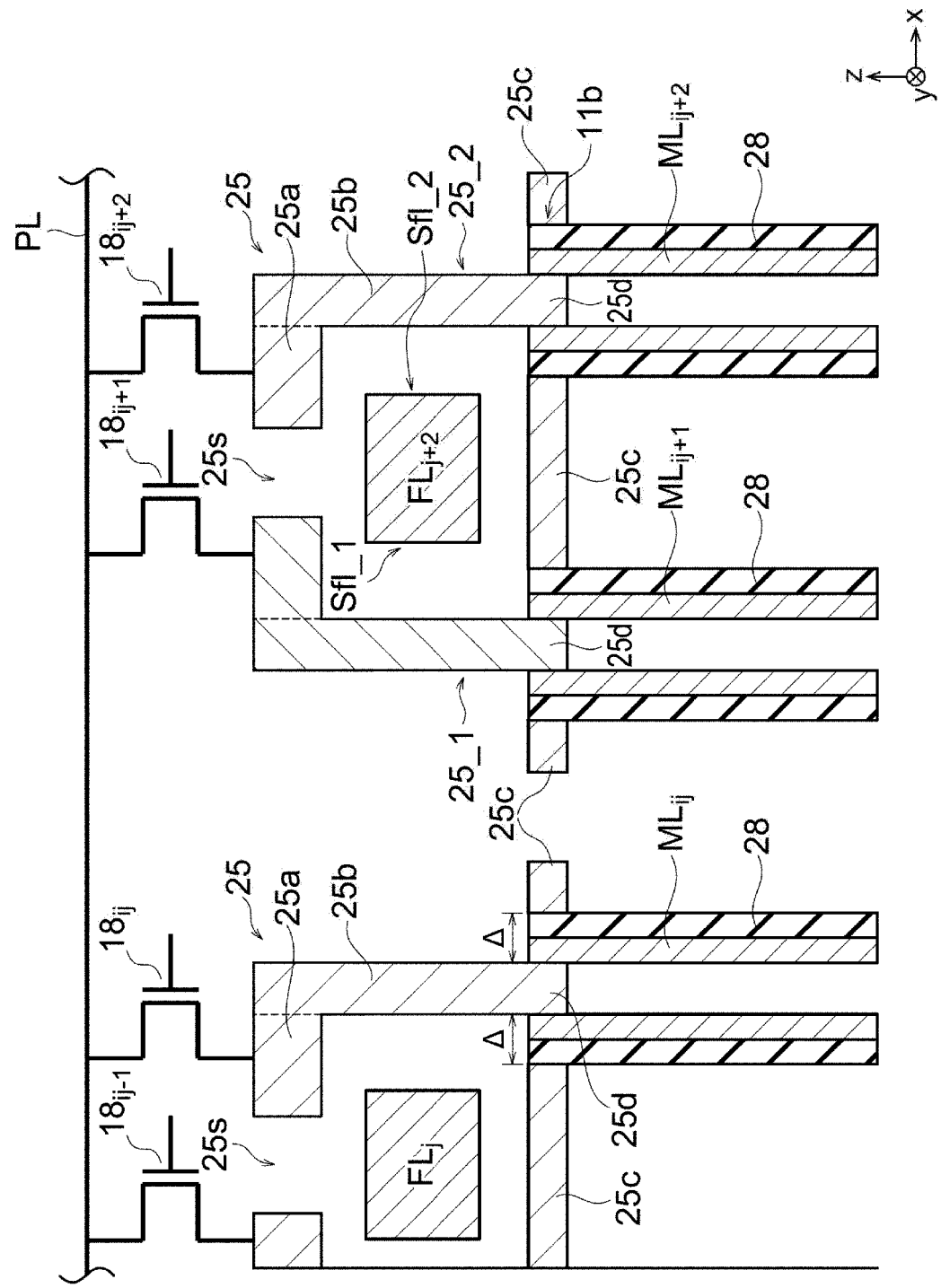
FIG. 16 is a diagram showing a configuration example of yokes, field lines, and magnetic members according to a fourth embodiment.
Figure 17:
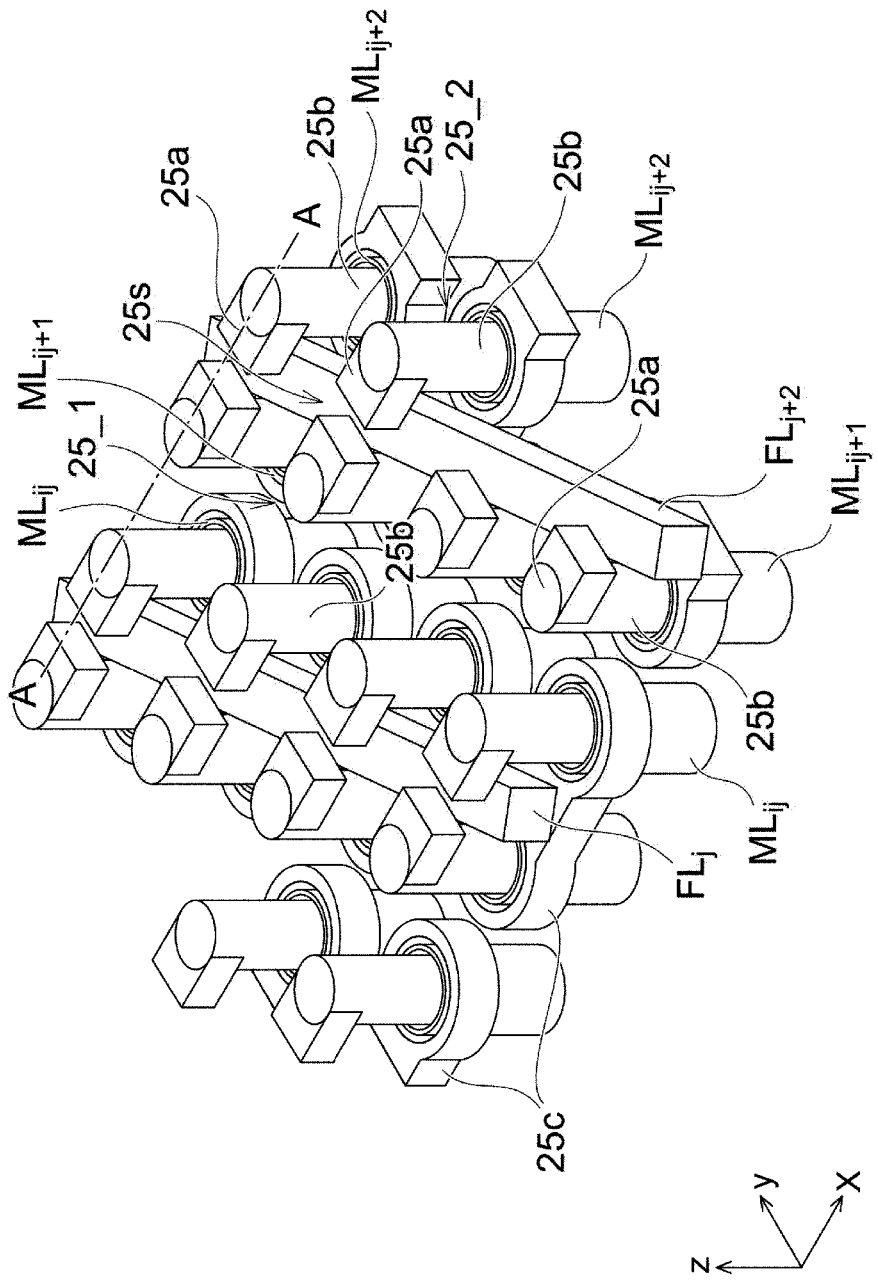
FIG. 17 is a perspective view of a configuration example of yokes, field lines, and magnetic members according to a fourth embodiment.

FIG. 16 is a diagram showing a configuration example according to a fourth embodiment. FIG. 17 is a perspective view showing the configuration example according to the fourth embodiment. FIG. 16 shows a cross section taken along a line A-A in FIG. 17.

In the fourth embodiment, a configuration of the field lines FL, the yokes 25$a$, 25$b$, and 25$d$, and the transistors 18 may be considered to be the same as the configuration in the second embodiment unless otherwise noted.

In the fourth embodiment, as shown in FIGS. 16 and 17, each yoke 25$c$ (return yoke) is provided below a respective one of the field lines FL and between two adjacent magnetic members ML. However, the yokes 25$c$ are electrically separated from one another at a position between the two adjacent field lines FL. The plurality of yokes 25$c$ adjacent to one another along the y-direction in FIG. 17 may be magnetically connected.

In this way, the yokes 25$c$ may be separated from each other between the adjacent field lines FL. In this case, the yokes 25$a$ to 25$d$ around each field line FL also constitute the magnetic circuit 25.

Other configurations and operations in the fourth embodiment may be the same as the configurations and the operations in the second embodiment. Therefore, the fourth embodiment can achieve the same effect as that of the second embodiment.

While certain embodiments have been described, these embodiments have been presented by way of example only, and are not intended to limit the scope of the disclosure. Indeed, the novel embodiments described herein may be embodied in a variety of other forms; furthermore, various omissions, substitutions, and changes in the form of the embodiments described herein may be made without departing from the spirit of the disclosure. The accompanying claims and their equivalents are intended to cover such forms or modifications as would fall within the scope and spirit of the disclosure.

What is claimed is:

1. A magnetic memory, comprising:
    a plurality of first magnetic members, each extending along a first direction and having a first end portion and a second end portion;
    a first wiring and a second wiring on a second end side of the first magnetic members spaced apart from the first magnetic members, the first and second wirings extending along a second direction intersecting the first direction, and adjacent to each other in a third direction intersecting the first direction and the second direction, with at least one of the first magnetic members being at a position between the first wiring and the second wiring in a plan view from the first direction;
    a second magnetic member including a first portion facing a first side surface of the first wiring and a second portion facing a second side surface of the first wiring on a side opposite to the first side surface, the first portion being electrically connected to one of the first magnetic members on a side of the first portion closer to the first side surface, the second portion being electrically connected to another one of the first magnetic members on a side of the second portion closer to the second side surface; and
    a control circuit electrically connected to the first wiring and the second wiring, wherein
    the control circuit is configured to cause a current to flow through one of the first wiring or the second wiring when data is written into the one of the first magnetic members that is positioned between the first and second wirings in the plan view.

2. The magnetic memory according to claim 1, wherein the first portion and the second portion are electrically separated from each other.

3. The magnetic memory according to claim 2, wherein the first portion and the second portion are separated from each other at a position farther from the one of the first magnetic members than the first wiring in the first direction.

4. The magnetic memory according to claim 3, wherein the first portion and the second portion are magnetically connected.

5. The magnetic memory according to claim 4, further comprising:
    an insulating soft magnetic material between the first portion and the second portion.

6. The magnetic memory according to claim 5, wherein the second magnetic member further includes a third portion at a position that is closer in the first direction to the one of the first magnetic members than is the first wiring, the third portion being electrically separated from the first and second portions.

7. The magnetic memory according to claim 5, further comprising:
    a first electrode on the second end side of the first magnetic members;
    a first switching element connected between the first electrode and the first portion; and
    a second switching element connected between the first electrode and the second portion.

8. The magnetic memory according to claim 5, further comprising:
    a plurality of magnetoresistive elements each having one end electrically connected to the first end portion of a respective one of the plurality of first magnetic members.

9. The magnetic memory according to claim 5, wherein more than one of the first magnetic members are between the first wiring and the second wiring in the plan view from the first direction.

10. The magnetic memory according to claim 1, wherein the first portion and the second portion are physically separated from each other in the third direction at a position farther from the one of the first magnetic members in the first direction than is the first and second wirings.

11. The magnetic memory according to claim 1, wherein the first portion and the second portion are magnetically connected.

12. The magnetic memory according to claim 1, further comprising:
    an insulating soft magnetic material between the first portion and the second portion in the third direction.

13. The magnetic memory according to claim 12, wherein the second magnetic member further includes a third portion at a position that is closer in the first direction to the one of the first magnetic members than is the first wiring, the third portion being electrically separated from the first and second portions.

14. The magnetic memory according to claim 12, further comprising:
    a first electrode on the second end side of the first magnetic members;
    a first switching element connected between the first electrode and the first portion; and
    a second switching element connected between the first electrode and the second portion.

15. The magnetic memory according to claim 12, further comprising:
    a plurality of magnetoresistive elements each having one end electrically connected to the first end portion of a respective one of the plurality of first magnetic members.

16. The magnetic memory according to claim 12, wherein more than one of the first magnetic members are between the first wiring and the second wiring in the plan view from the first direction.

17. The magnetic memory according to claim 1, wherein the second magnetic member further includes a third portion at a position that is closer in the first direction to the one of the first magnetic members than is the first wiring, the third portion being electrically separated from the first and second portions.

18. The magnetic memory according to claim 1, further comprising:
    a first electrode on the second end side of the first magnetic members;
    a first switching element connected between the first electrode and the first portion; and
    a second switching element connected between the first electrode and the second portion.

19. The magnetic memory according to claim 1, further comprising:
a plurality of magnetoresistive elements each having one end electrically connected to the first end portion of a respective one of the plurality of first magnetic members.

20. The magnetic memory according to claim 1, wherein more than one of the first magnetic members are between the first wiring and the second wiring in the plan view from the first direction.

21. The magnetic memory according to claim 20, further comprising:
a third magnetic member with a fourth portion facing a third side surface of the second wiring and electrically connected to a one of the first magnetic members on a side closer to the third side surface, and a fifth portion facing a fourth side surface of the second wiring on a side opposite to the third side surface and electrically connected to another one of the first magnetic members on a side closer to the fourth side surface.

22. The magnetic memory according to claim 1, wherein one of the first portion or the second portion is between the first and second wirings, and
the control circuit causes the current to flow through only one of the first wiring or second wiring when the data is to be written into the one of the first magnetic members between the first and second wirings in the plan view.

23. The magnetic memory according to claim 1, wherein the first magnetic members each have a tubular shape.

24. The magnetic memory according to claim 1, wherein the second magnetic member further includes a third portion at a position closer in the first direction to the one of the first magnetic members than is the first wiring, the third portion being electrically separated from the first and second portions at a position between the first wiring and the second wiring in the plan view.

25. A magnetic memory, comprising:
a first magnetic member extending along a first direction and having a first end portion and a second end portion;
a second magnetic member extending along the first direction and having a third end portion and a fourth end portion;
a first wiring provided on a second end side of the first magnetic member and a fourth end side of the second magnetic member, the first wiring spaced apart from the first and second magnetic members and extending along a second direction intersecting the first direction, the first wiring being at a position between the first and second magnetic members in a plan view from the first direction;
a third magnetic member including a first portion facing a first side surface of the first wiring and a second portion facing a second side surface of the first wiring on a side opposite to the first side surface, the first portion being electrically connected to the first magnetic member on a side closer to the first side surface, the second portion being electrically connected to the second magnetic member on a side closer to the second side surface, the first and second portions being electrically separated from each other;
a first electrode on the second end side of the first magnetic member and the fourth end side of the second magnetic member;
a first switching element connected between the first electrode and the first portion; and
a second switching element connected between the first electrode and the second portion.

26. The magnetic memory according to claim 25, wherein the first and second portions are magnetically coupled but physically separated from each other.

27. The magnetic memory according to claim 25, further comprising:
an insulating soft magnetic material between the first portion and the second portion.

28. The magnetic memory according to claim 27, wherein the first portion and the second portion are separated from each other at a position farther from the first and second magnetic members than the first wiring in the first direction.

29. The magnetic memory according to claim 27, wherein the first portion and the second portion are magnetically coupled.

30. The magnetic memory according to claim 27, wherein the third magnetic member further includes a third portion at a position that is closer in the first direction to the first and second magnetic members than is the first wiring, the third portion being electrically separated from the first and second portions.

31. The magnetic memory according to claim 27, further comprising:
a first magnetoresistive element having one end electrically connected to the first end portion of the first magnetic member; and
a second magnetoresistive element having one end electrically connected to the third end portion of the second magnetic member.

32. The magnetic memory according to claim 27, wherein the first and second magnetic members each have a tubular shape.

33. The magnetic memory according to claim 25, wherein the first and second magnetic members each have a tubular shape.

* * * * *